(12) United States Patent
Haslinger et al.

(10) Patent No.: US 12,190,665 B2
(45) Date of Patent: *Jan. 7, 2025

(54) ACCESS CONTROL METHOD FOR PERSONS AND SYSTEM FOR CARRYING OUT THE METHOD

(71) Applicant: SKIDATA GmbH, Grödig/Salzburg (AT)

(72) Inventors: Martin Haslinger, Grödig/Salzburg (AT); Walter Lechner, Grödig/Salzburg (AT); Martin Haidacher, Grödig/Salzburg (AT)

(73) Assignee: SKIDATA GmbH, Grödig/Salzburg (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,660

(22) Filed: Nov. 6, 2023

(65) Prior Publication Data

US 2024/0078857 A1   Mar. 7, 2024

Related U.S. Application Data

(63) Continuation of application No. 17/502,435, filed on Oct. 15, 2021, now Pat. No. 11,854,321.

(30) Foreign Application Priority Data

Oct. 15, 2020   (EP) .................................... 20202025

(51) Int. Cl.
*G07C 9/00*     (2020.01)
*H04B 17/327*   (2015.01)

(52) U.S. Cl.
CPC ....... *G07C 9/00309* (2013.01); *H04B 17/327* (2015.01); *G07C 2009/00357* (2013.01);
(Continued)

(58) Field of Classification Search
None
See application file for complete search history.

(56) References Cited

U.S. PATENT DOCUMENTS 9,472,034 B2   10/2016   Ahearn et al.
9,715,773 B2    7/2017   Clemente et al.
(Continued)

FOREIGN PATENT DOCUMENTS

| EP | 2 991 041 A2 | 3/2016 |
| EP | 3 131 065 A1 | 2/2017 |
| WO | 2018/174944 A1 | 9/2018 |

OTHER PUBLICATIONS

Jagtap V S et al: "Augmented Execution in Mobile Cloud Computing: A Survey", 2014 International Conference on Electronic Systems, Signal Processing and Computing Technologies, IEEE, Jan. 9, 2014 (Jan. 9, 2014), pp. 237-244.
(Continued)

*Primary Examiner* — K. Wong
(74) *Attorney, Agent, or Firm* — Finch & Maloney PLLC

(57) ABSTRACT

An access control method for people in which the access control device (16) is assigned to an access point. Each access control device (16) has at least one antenna (1, 2, 8, 9, 10, 11), which emits beacons. Each access area (3) can only accommodate one person at a time. All antennas lie on an antenna plane. The transmitted beacons containing a unique access point ID, which positively identifies the access point and a unique antenna ID within predefined intervals. The received beacons are analyzed based on the RSSIs (Received Signal Strength Indicator) such that the distance of the mobile device (14) to the at least one antenna (1, 2, 8, 9, 10, 11) is determined. The received access point ID are transmitted to a server (15) or to the access control
(Continued)

device (16) for analysis. Access is granted if the access authorization is valid for the access point ID.

18 Claims, 6 Drawing Sheets

(52) U.S. Cl.
CPC ............... *G07C 2009/0042* (2013.01); *G07C 2009/00507* (2013.01)

(56) References Cited

U.S. PATENT DOCUMENTS

| | | |
|---|---|---|
| 11,433,854 B2 | 9/2022 | Lechner et al. |
| 11,631,329 B2 | 4/2023 | Chen et al. |
| 11,854,321 B2 * | 12/2023 | Haslinger ............ H04B 17/327 |
| 2016/0049028 A1 | 2/2016 | Kusens et al. |
| 2017/0372544 A1 | 12/2017 | Schlechter et al. |
| 2022/0092900 A1 | 3/2022 | Shaikh et al. |

OTHER PUBLICATIONS

European Office Action Corresponding to 20202025.1 mailed Mar. 22, 2023.

* cited by examiner

ACCESS CONTROL METHOD FOR PERSONS AND SYSTEM FOR CARRYING OUT THE METHOD

This application is a continuation application of U.S. application Ser. No. 17/502,435 filed Oct. 15, 2021, which claims priority from European patent application serial no. 20202025.1 filed Oct. 15, 2020.

FIELD OF THE INVENTION

The present invention pertains to an access control method for persons according to the independent claim(s). The invention furthermore pertains to an access control system for persons, particularly for carrying out the inventive method.

BACKGROUND OF THE INVENTION

Access control methods for persons are known from the prior art. In this context, an access control is typically realized by reading out access authorizations in a contactless manner, wherein access control devices are provided and comprise means for detecting and analyzing access authorizations, as well as mechanical or other locking elements that are automatically or manually transferred from a locking position into a release position upon presentation of a valid access authorization. Other known access control devices are realized without locking elements.

According to the prior art, different contactless communication standards such as WLAN, BLE (Bluetooth Low Energy), RFID or NFC may be used for reading out access authorizations in a contactless manner, wherein the access control devices comprise for this purpose at least one reading device or antenna unit, which receive signals of a data carrier that contain an access authorization or an ID, to which an access authorization is assigned.

A few of these standards such as NFC or the contactless readout of access authorizations by means of barcode scanners have a very short range such that merely a "touch and go" functionality—but no advantageous "hands-free" functionality—is provided.

In standards that have a greater range and therefore provide the desired "hands-free" functionality, it is necessary to adjust the range of the reading devices or antennas in such a way that data carriers are only detected within a certain distance and in the correct direction in order to avoid separation and collision problems with data carriers of queued persons or vehicles. In the case of multilane access, it is furthermore necessary to realize a reliable lane or access separation.

It should also be taken into consideration that data carriers in the form of mobile telephones behave differently with respect to the emission of signals in dependence on the antenna arrangement and the power or configuration of the installed hardware.

SUMMARY OF THE INVENTION

The present invention is based on the objective of disclosing a simplified access control method in an access control system for persons that comprises at least one access control device, wherein the verification of an access authorization is in this method realized based on the analysis of an ID, which is transmitted from a data carrier to an access control device by means of a wireless communication standard and to which at least one access authorization can be explicitly assigned.

The inventive method particularly should allow "hands-free" access control, wherein separation and collision problems with data carriers of queued persons or vehicles are avoided and a reliable lane or access separation is ensured in the case of multilane access. The data carrier located closest to an access control device in the direction of access particularly should be determined in order to subsequently analyze the ID, which is transmitted by this data carrier and to which at least one access authorization is explicitly assigned, and to grant access if the access authorization is valid.

The invention furthermore aims to disclose an access control system for persons, particularly for carrying out the inventive method.

This objective is attained by means of a method with the characteristics of the independent claim(s). An access control system for persons, particularly for carrying out the inventive method, forms the object of claim 16. Other inventive embodiments and advantages can be gathered from the corresponding dependent claims.

Accordingly, the invention proposes an access control method in an access control system for persons, wherein the access control system comprises at least one access control device that is respectively assigned to an access point, wherein each access control device has at least one antenna, which is arranged at the access point in a defined manner and emits into the access area, i.e. into an area of predefined length and width, through which a visitor has to pass when attempting to gain access and which due to its dimensions can only accommodate one person, wherein all antennas of an access control device respectively lie on an antenna plane, wherein the at least one antenna transmits in the course of this method beacons containing a unique access point ID, which positively identifies the access point at which the at least one antenna is arranged, and a unique antenna ID within predefined intervals, preferably in intervals of 100-200 msec, and wherein the beacons received by a mobile device are analyzed based on the RSSIs (Received Signal Strength Indicator) such that the distance of the mobile device to the at least one antenna is determined. The beacons preferably are BLE (Bluetooth Low Energy) beacons, but it is also possible to use any other suitable standard. A person skilled in the art is quite familiar with RSSI methods.

If the determined distance of the mobile device to the at least one antenna of an access control device falls short of a predefined threshold value, it is proposed to transmit an ID, which is stored in the mobile device and to which an access authorization can be explicitly assigned, and the received access point ID of this access control device to a server of the access control system or to the respective access control device by means of a wireless communication standard in order to analyze the validity of the access authorization assigned to the ID, wherein access is granted if the access authorization is valid for the access point ID, e.g. by controlling a locking element of the access control device.

The operator of the access control device can be informed if no locking elements are provided and no valid access authorization for the access point ID is presented, wherein an optical and/or acoustical signal can be output. The access control devices are connected to a server of the access control system.

It is particularly advantageous to realize an embodiment, in which three antennas are provided, in order to thereby increase the accuracy of the localization of the mobile device with respect to the access point.

According to an enhancement of the invention, the at least one access control device has at least two antennas that are arranged in a predetermined manner and at a defined distance from one another, wherein said antennas emit into the access area, i.e. into an area of predefined length and width, through which a visitor has to pass when attempting to gain access and which due to its dimensions can only accommodate one person, wherein all antennas lie on an antenna plane, and wherein the analysis of the beacons received by a mobile electronic device takes place in that all received beacons are in a first step grouped in access control devices based on the unique access point ID.

According to the invention, all beacons associated with each individual access point ID are analyzed as follows:
the received signal strength of the beacons (RSSI) is smoothed per antenna ID, optionally by means of a moving average filter, preferably by means of an exponential moving average filter, in order to thereby filter individual runaway values in the signal strength;
at least one and no more than $$\binom{n}{2}$$

antenna pairs are formed of the existing n antennas, wherein the distance of the mobile electronic device to a virtual line on the antenna plane, which connects the antennas of the respective antenna pair to one another, and therefore to the antenna plane is determined as the length of the perpendicular distance of the farthest possible position of the mobile electronic device from the antenna plane to the virtual line and to the antenna plane by means of bilateration based on the received signal strength of the beacons of two respective antennas of an antenna pair;
the determined distances to the virtual line on the antenna plane, which connects the antennas of the respective antenna pair to one another, are analyzed in order to ascertain if at least one or a predefined number of the determined distances falls below a certain threshold value, in which case an ID, which is stored in the mobile device and to which an access authorization can be explicitly assigned, and the received access point ID are transmitted to a server or to the access control device by means of a wireless communication standard in order to analyze the validity of the access authorization assigned to the ID, wherein access is granted if the access authorization is valid for the access point ID.

According to an enhancement of the invention, it is proposed that the determined distances of the mobile electronic device to a virtual line on the antenna plane, which connects the antennas of the respective antenna pair to one another, are used for respectively defining a virtual antenna on the virtual connecting line between the examined antennas of the respective antenna pair and for assigning to this virtual antenna a virtual distance to the mobile device, i.e. a virtual radius corresponding to the determined distance to the virtual line at the position of the virtual antenna. The position of the virtual antenna corresponds to the dropped perpendicular foot of the perpendicular distance of the farthest possible position of the mobile electronic device from the antenna plane to the virtual line and to the antenna plane.

The at least one thusly defined virtual antenna advantageously is used for forming a virtual antenna pair in combination with another antenna, which may also be a virtual or an existing antenna, and for determining the distance of the mobile electronic device to a virtual line on the antenna plane, which connects the antennas of the virtual antenna pair to one another, and therefore to the antenna plane as the length of the perpendicular distance of the farthest possible position of the mobile electronic device from the antenna plane to the virtual line and to the antenna plane by means of bilateration based on the received signal strength of the beacons of these antennas, wherein all determined distances of the mobile electronic device to a virtual line on the antenna plane, which connects the antennas of the respective and optionally also virtual antenna pair to one another, are analyzed.

In this way, the existing antennas are arbitrarily combined for bilateration purposes in order to increase the accuracy in determining the distance of the mobile device to the antenna plane.

The mobile device may be realized, for example, in the form of a mobile telephone, a tablet or a smart watch.

According to the invention, the antennas are realized in the form of directional antennas and/or purposefully shielded in order to maximize the directional characteristic in the direction of the access area. Furthermore, the transmitting power of each antenna can be adapted in order to thereby allow better modeling of the desired detection range in the access area.

The RSSI analysis of the beacons may take place in the mobile device, wherein an ID, which is stored in the mobile device and to which an access authorization can be explicitly assigned, and the access point ID of an access control device received via the beacons are transmitted to a server of the access control system or to the respective access control device, which can be determined based on the access point ID, by means of a wireless communication standard in order to analyze the validity of the access authorization assigned to the ID if at least one or a predefined number of determined distances of the mobile device to the antenna plane of this access control device falls short of a threshold value, and wherein access is granted if the access authorization is valid for the access point ID.

According to an advantageous enhancement of the invention, it is proposed that the model of the respective mobile device is taken into consideration in the RSSI analysis of the beacons by using a model-specific correction value for the threshold value in order to compensate differences with respect to the reception sensitivity. The correction values may be stored in a characteristic. In order to optimize the RSSI analysis of the beacons, it would furthermore be possible to use data of existing distance sensors of the mobile devices, which may be realized, e.g., in the form of infrared sensors, in order to ascertain if a mobile device is located in a pocket such as a trouser pocket or in a carrying bag or backpack of the user, wherein a predefined offset that changes the threshold value is additionally used if this is the case; if it mobile device is located in a pocket of the user, the threshold value for the distance is increased in order to compensate the weaker reception in the pocket. It would furthermore be possible to optimize the RSSI analysis of the beacons in the corresponding mobile device by determining if the mobile device is currently in use, i.e. if the display is turned on, wherein a predefined offset that reduces the threshold value for the distance is additionally used if this is the case.

These parameters are taken into consideration in the course of the analysis in the mobile devices. According to the invention, the steps of the method to be carried out in the mobile device are controlled by an app, wherein the antenna configuration, particularly the spatial arrangement of the antennas of the access control devices and their distance from one another, preferably is stored in the app in order to allow the analysis of the signal strength of the received beacons and the determination of the distance of the mobile electronic device to the antennas or the antenna plane as elucidated in this description. If the antenna configuration of the antennas of the access control devices differs in dependence on the respective access control device, the antenna configuration of the antennas of the access control devices is stored in the app in dependence on the access point ID. Furthermore, the model-specific correction values for the threshold value and the offsets, which are used when a mobile device is located in a pocket of the user or when the mobile device is currently in use, are also stored in the app.

According to an enhancement of the invention, the determined distances determined may be recorded in the mobile device during each entry in the course of the analysis of the beacons in the mobile device, wherein the received signal strengths of the beacons are reduced by a predefined factor prior to the RSSI analysis in order to prevent crosstalk if a predefined lower threshold value is not reached n-times, and wherein n is a predefined integral number ≥1. A user-dependent adaptation is thereby realized.

As an alternative to the analysis of the beacons in the mobile device, the RSSI analysis of the beacons may take place in a server of the access control system, wherein a connection between the mobile device and the server is for this purpose established by means of a wireless communication standard, wherein the received beacons are forwarded to the server via this connection together with the ID stored in the mobile device, to which an access authorization can be explicitly assigned, the received access point ID, optionally the data of existing distance sensors, optionally the information if the mobile device is currently in use and optionally the model of the respective mobile device, wherein the validity of the access authorization assigned to the ID is analyzed if at least one or a predefined number of the determined distances to the antenna plane of an access control device falls short of a threshold value, and wherein access is granted if the access authorization is valid for the access point ID.

The wireless communication standard between the mobile device and components of the access control system may be a WIFI, GSM, LTE, 5G or Bluetooth standard.

BRIEF DESCRIPTION OF THE DRAWINGS

Exemplary embodiments of the invention are described in greater detail below with reference to the attached figures. In these figures.

DETAILED DESCRIPTION OF THE PREFERRED EMBODIMENTS

Figure 1:
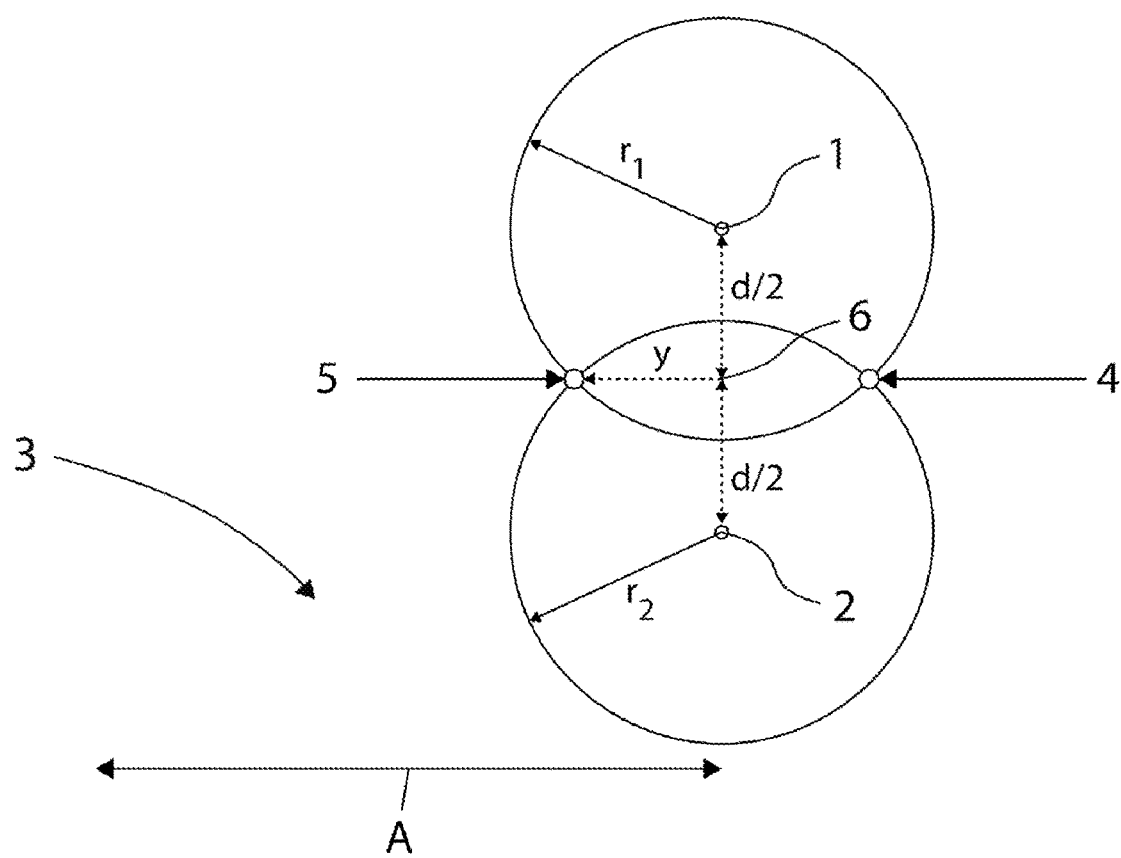
FIG. 1 shows a schematic representation of the determination of the distance of the mobile electronic device to a virtual line on the antenna plane, which connects the antennas of an antenna pair to one another, and therefore to the antenna plane by means of bilateration.

According to an embodiment of the invention and with reference to FIG. 1, the at least one access control device of the access control system has at least two antennas that are arranged in a predetermined manner and at a defined distance from one another, wherein all antennas lie on an antenna plane. The analysis of the beacons received by a mobile electronic device, e.g. by a mobile telephone, takes place in that all received beacons are in a first step grouped in access control devices based on the unique access point ID, wherein all beacons associated with each individual access point ID are analyzed as follows:

In a second, optional step, the received signal strength of the beacons (RSSI) is smoothed per antenna ID, optionally by means of a moving average filter, preferably by means of an exponential moving average filter, in order to thereby filter individual runaway values in the signal strength.

In a third step, at least one and no more than $$\binom{n}{2}$$

antenna pairs are formed of the existing n antennas, wherein n≥2, and wherein the distance of the mobile electronic device to a virtual line on the antenna plane, which connects the antennas of the respective antenna pair to one another, and therefore to the antenna plane is determined as the length of the perpendicular distance of the farthest possible position of the mobile electronic device from the antenna plane to the virtual line and to the antenna plane by means of bilateration based on the received signal strength of the beacons of two respective antennas of an antenna pair. This is exemplified in FIG. 1.

FIG. 1 shows two antennas 1, 2 that form an antenna pair, wherein a distance y of the mobile electronic device to a virtual line on the antenna plane, which connects the antennas 1, 2 to one another, and therefore to the antenna plane is determined between these antennas by means of bilateration. The figure shows a top view of the access area. The formula $$y = \sqrt{r_1^2 - \left(\frac{r_1^2 - r_2^2 + d^2}{2d}\right)^2}$$

applies in this case, wherein d represents the distance between the antennas, r1 represents the distance to the antenna 1 determined after the RSSI analysis and r2 represents the distance to the antenna 1 determined after the RSSI analysis. The antenna plane extends perpendicular to the plane of the figure.

In the example illustrated in FIG. 1, it is for reasons of simplification assumed that the signal strengths of the beacons received by the antennas 1, 2 are identical such that r1=r2. The access area is identified by the reference symbol 3, wherein the arrow A represents the width of the access area. The intersection points of the spheres with the radii r1 and r2 around the respective antennas 1 and 2 lie on an intersection circle, wherein the invention proposes that only the intersection points 4 and 5 located farthest from the antenna plane are examined and position 4 is for reasons of plausibility not taken into consideration because it does not lie in the access area 3. The determined position of the mobile electronic device in the example shown therefore is the position 5, which has the distance y to the antenna plane that is defined as the length of the perpendicular distance of the farthest possible position of the mobile electronic device from the antenna plane to the virtual line and to the antenna plane.

According to the invention, the determined distances y of the mobile electronic device to the virtual line on the antenna plane, which connects the antennas of the respective antenna pair to one another, are analyzed in order to ascertain if at least one or a predefined number of the determined distances falls below a certain threshold value, in which case an ID, which is stored in the mobile device and to which an access authorization can be explicitly assigned, and the received access point ID are transmitted to a server or to the access control device by means of a wireless communication standard in order to analyze the validity of the access authorization, wherein access is granted if the access authorization is valid for the access point ID. If the analysis of the validity of the access authorization takes place in the server, the results of the analysis is transmitted to the respective access control device, wherein an optionally provided locking element of the access control device is actuated in the opening direction if the access authorization is valid.

According to an enhancement of the invention, the determined distance y to a virtual line on the antenna plane, which connects the antennas 1, 2 of the antenna pair to one another, is used for respectively defining a virtual antenna on the virtual connecting line between the examined antennas of the respective antenna pair and for assigning to this virtual antenna a virtual distance y to the mobile device, i.e. a virtual radius at the position 6 of the virtual antenna, which position corresponds to the dropped perpendicular foot of the perpendicular distance of the farthest possible position of the mobile electronic device from the antenna plane to the virtual line and to the antenna plane.

The thusly defined virtual antenna can be advantageously used for forming a virtual antenna pair in combination with another antenna, which may also be a virtual or an existing antenna, and for determining the distance of the mobile electronic device to a virtual line on the antenna plane, which connects the antennas of the virtual antenna pair to one another, and therefore to the antenna plane as the length of the perpendicular distance of the farthest possible position of the mobile electronic device from the antenna plane to the virtual line and to the antenna plane by means of bilateration, wherein all determined distances of the mobile electronic device, namely the distances determined by means of existing and virtual antenna pairs, are analyzed in order to ascertain if at least one or a predefined number of the determined distances falls below a certain threshold value. A radius y around the position 6 of the virtual antenna is used for bilateration purposes.

Figure 2:
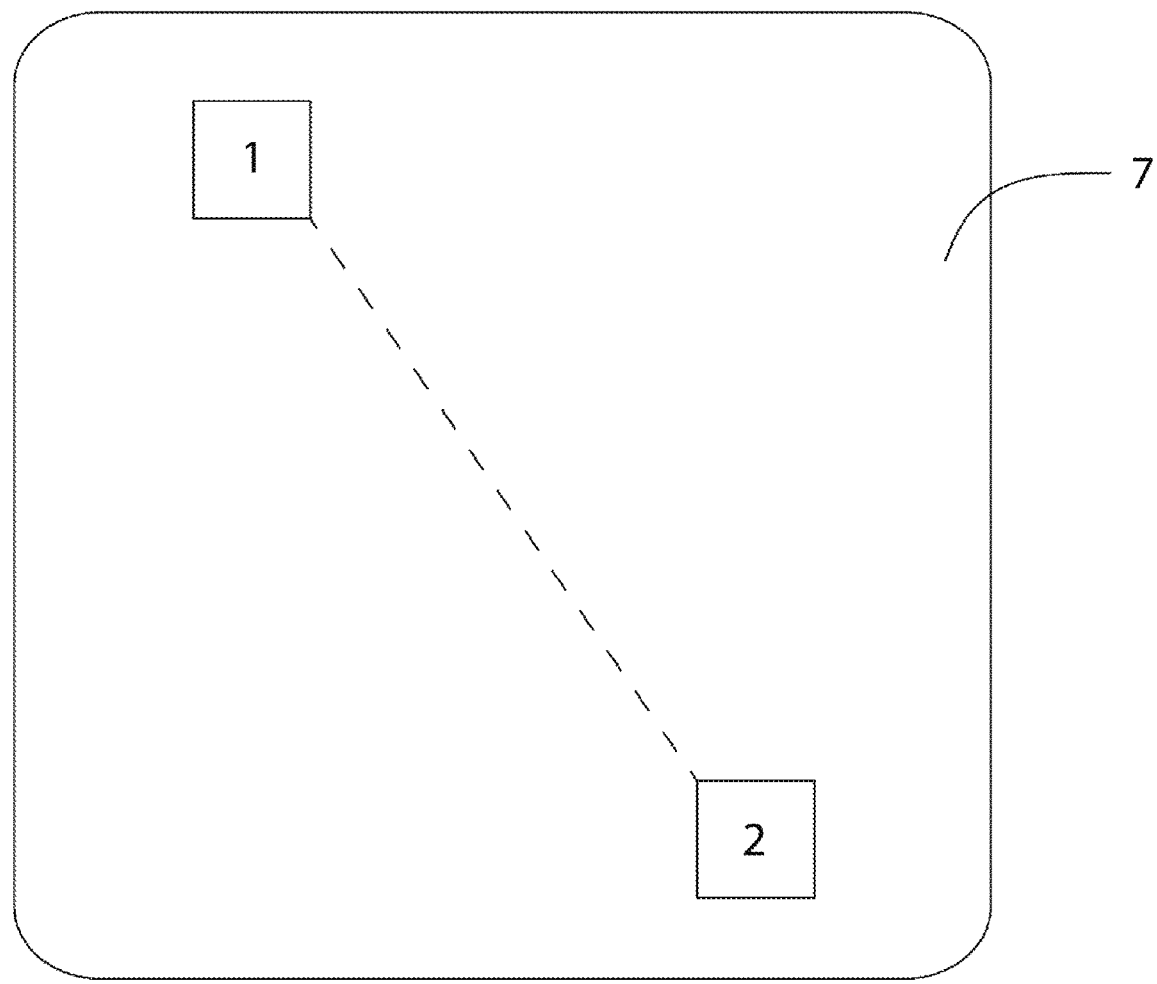
FIG. 2 shows a schematic representation of a possible arrangement of the antennas on the antenna plane.

A possible configuration is illustrated in FIG. 2; in this case, two antennas 1, 2 are provided on the antenna plane and arranged on a carrier surface 7, which essentially extends perpendicular to the access plane. In the example shown, the length of the carrier surface 7 essentially corresponds to the length of the access area. The antennas 1, 2 respectively are arranged in the vicinity of an upper and a diametrically opposite lower corner of the carrier 7 in order to cover the access area.

Figure 3:
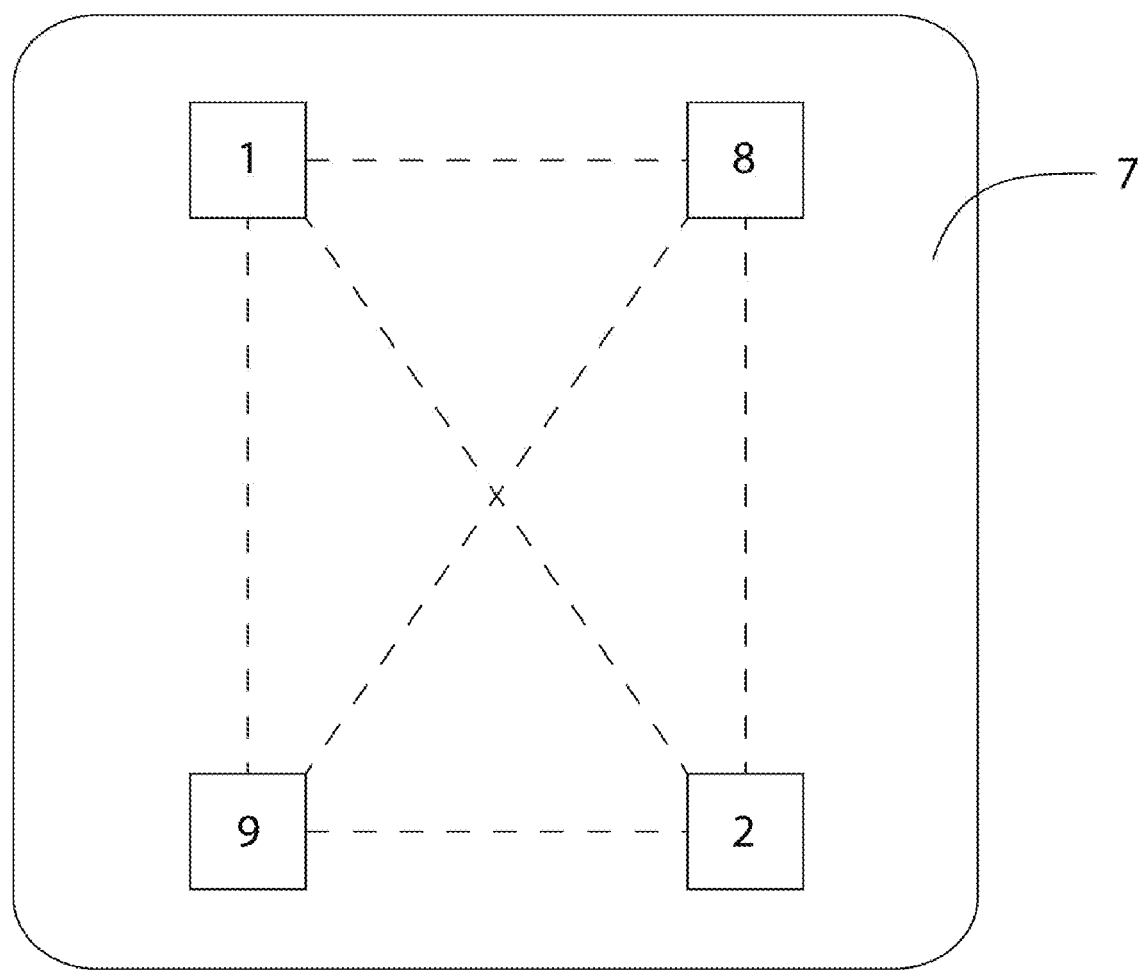
FIG. 3 shows a schematic representation of another possible arrangement of the antennas on the antenna plane.

FIG. 3 shows an antenna configuration, in which four antennas 1, 2, 8, 9 are provided on the carrier surface 7 and respectively arranged in the vicinity of a corner of the carrier surface 7. The broken lines respectively connect two antennas of a potential antenna pair, wherein six antenna pairs can be formed for the RSSI analysis of the beacons if four antennas are provided; potential virtual antennas were not taken into consideration in this case.

Figure 4:
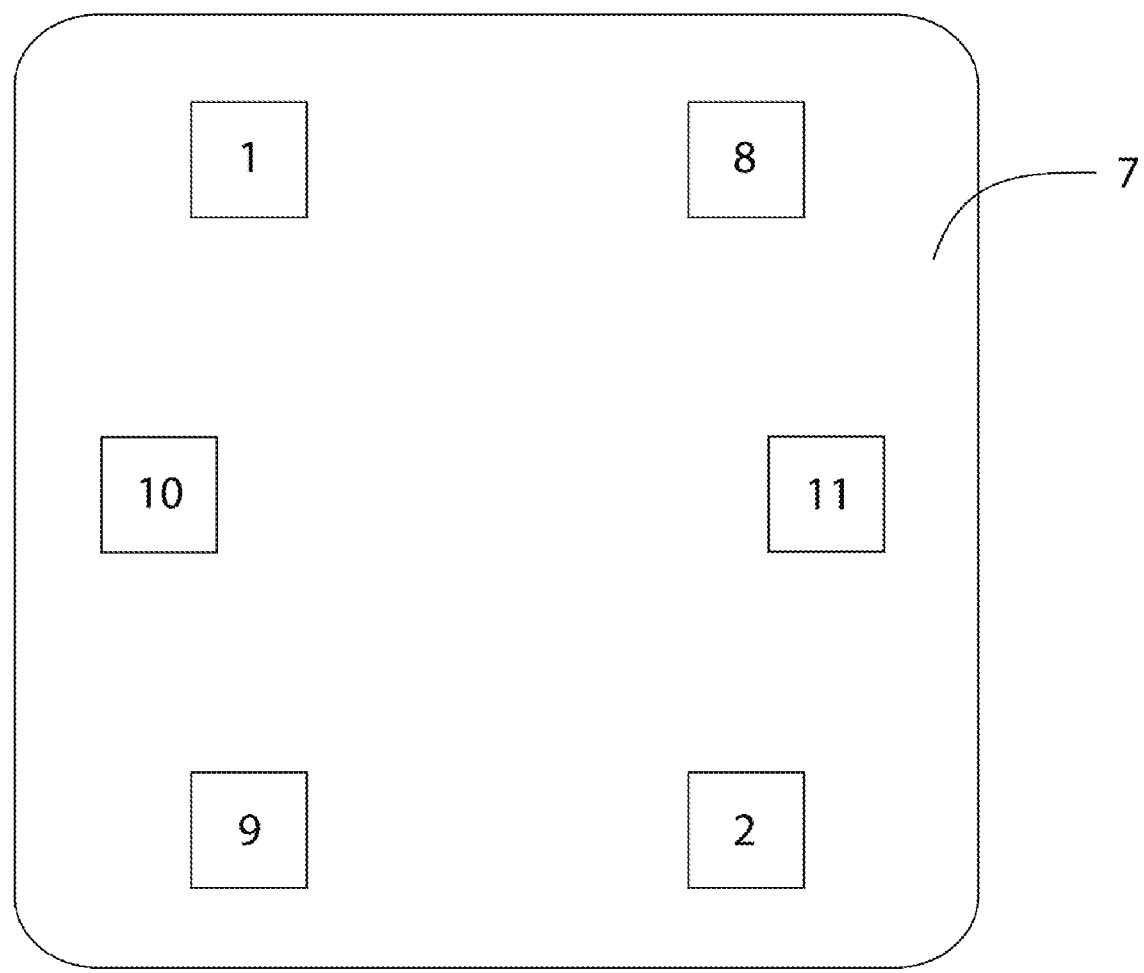
FIG. 4 shows a schematic representation of yet another possible arrangement of the antennas on the antenna plane.

In other embodiments, six antennas 1, 2, 8, 9, 10, 11 may be provided as exemplified in FIG. 4. Depending on the shape of the carrier surface 7, the antennas are arranged in such a way that the access area is covered.

Figure 5:
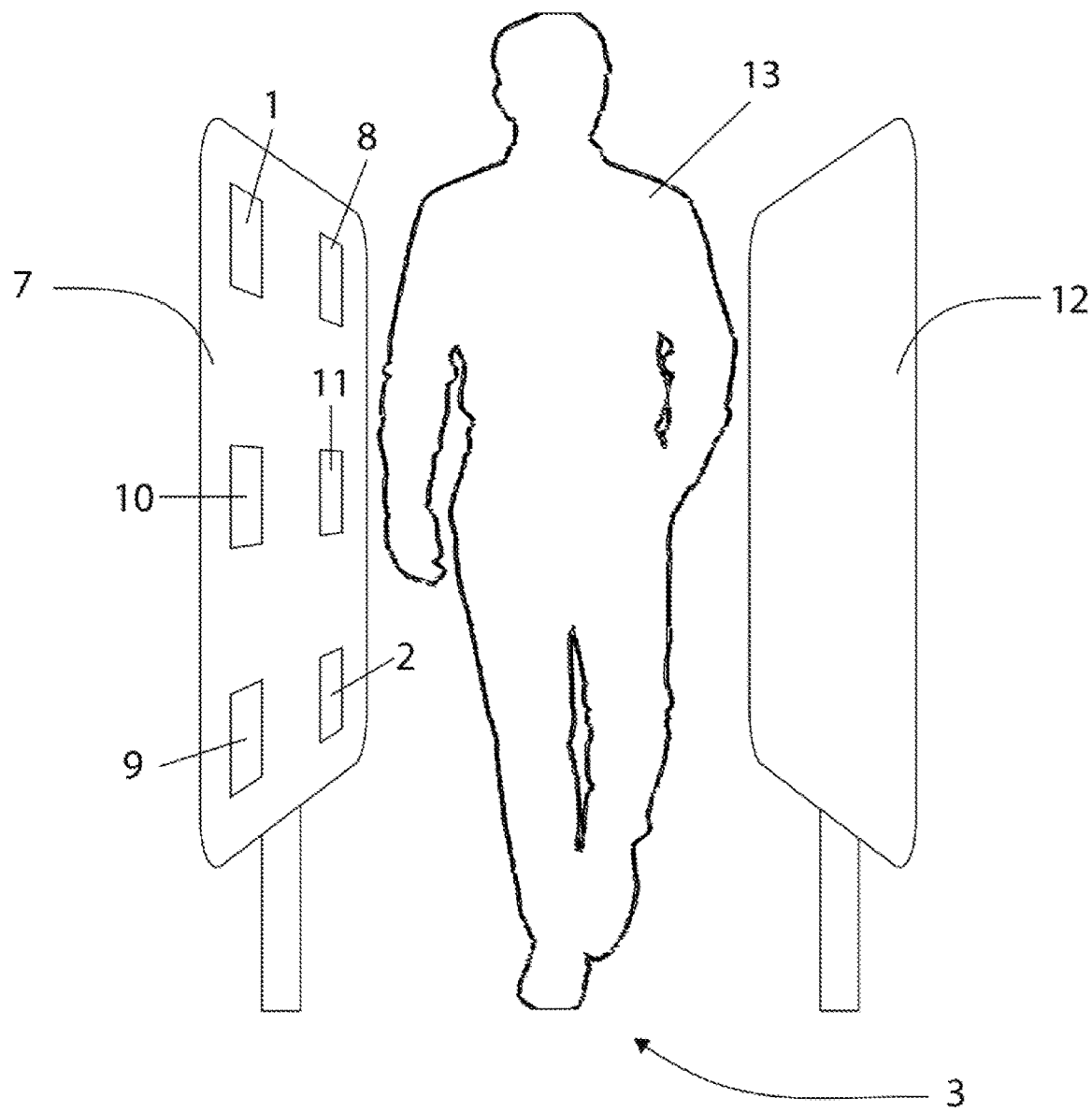
FIG. 5 shows a schematic representation of an access area and a possible arrangement of the antennas on the antenna plane.

FIG. 5 schematically shows an access point. In this example, the carrier surface 7 has six antennas 1, 2, 8, 9, 10, 11, wherein the access area 3 is delimited by a delimiting element 12 on the side lying opposite of the carrier surface 7. The antennas 1, 2, 8, 9, 10, 11, are arranged in such a way that a mobile device carried along by a person 13 receives the beacons when the person is located in the access area 3.

Figure 6:
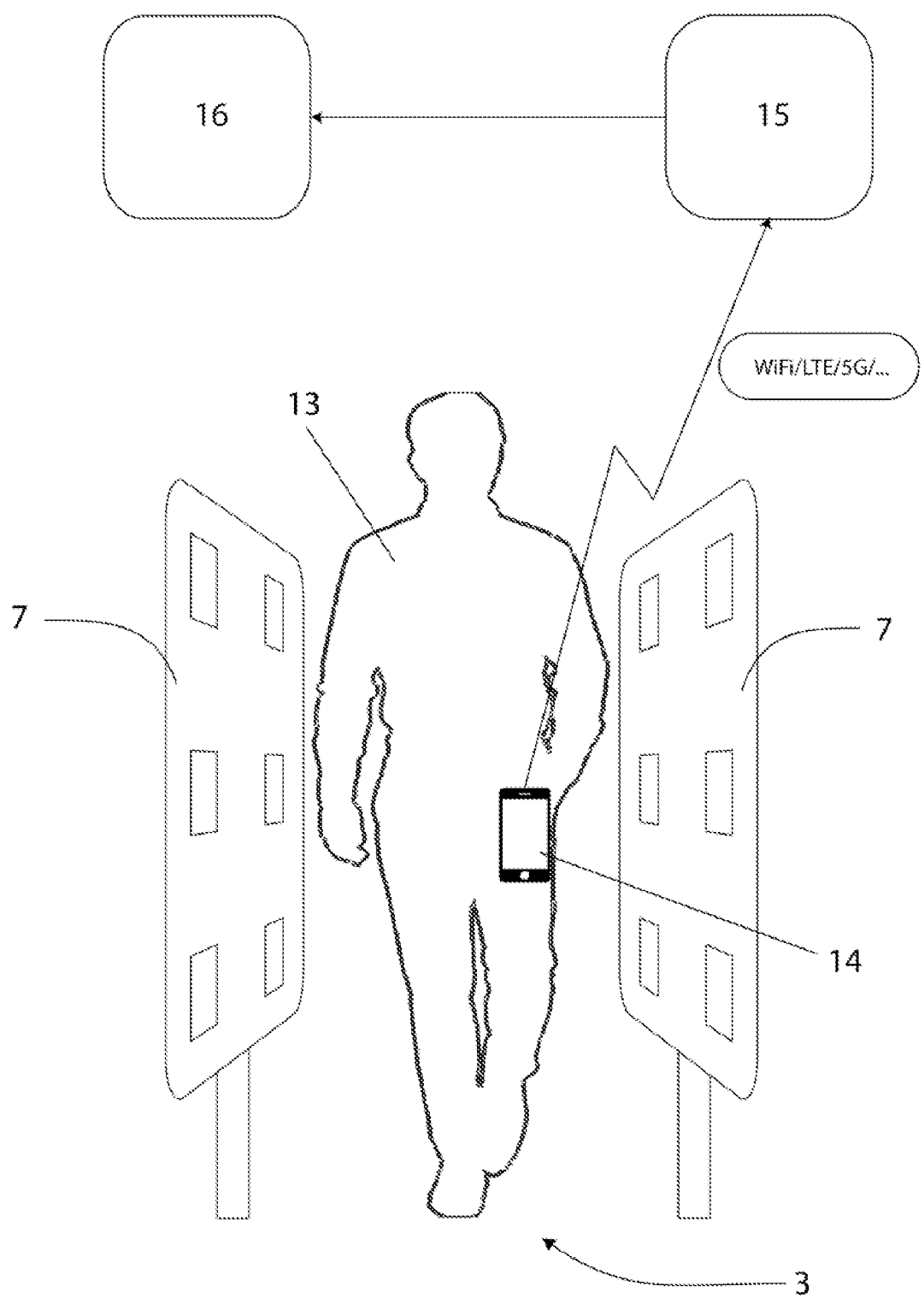
FIG. 6 shows a schematic representation of an access area and another possible arrangement of the antennas on the antenna plane, as well as the transmission of the ID stored in the mobile device and the received access point ID to the access control system after the analysis of the beacons if at least one or a predefined number of the determined distances falls short of a threshold value.

In the embodiment according to FIG. 6, six antennas are respectively arranged on both sides of the access area 3. If the RSSI analysis of the beacons takes place in the mobile device 14 and if at least one or a predefined number of the determined distances of the mobile device to the antenna plane of the antennas of an access control device falls short of a threshold value, an ID, which is stored in the mobile device 14 and to which an access authorization can be explicitly assigned, and the access point ID of the access control device received via the beacons are transmitted to a server 15 of the access control system or to the access control device 16 by means of a wireless communication standard, e.g. WIFI, LTE or 5G, in order to analyze the validity of the access authorization assigned to the ID, wherein access is granted if the access authorization is valid for the access point ID. In the example shown, the transmission takes place to a server 15, which after verifying or analyzing the validity of the access authorization assigned to the ID transmits the results to the respective access control device 16, wherein access is granted if the access authorization is valid for the access point ID of the access control device 16, e.g., by controlling a locking element of the access control device.

Accordingly, an inventive access control system, particularly a system for carrying out the inventive method, comprises at least one access control device that is respectively assigned to an access point, wherein each access control device has at least one antenna, which is arranged at the access point in a defined manner and emits into the access area, i.e. into an area of predefined length and width, through which a visitor has to pass when attempting to gain access and which due to its dimensions can only accommodate one person, wherein all antennas of an access control device respectively lie on an antenna plane, wherein the at least one antenna is designed for transmitting beacons, preferably BLE beacons, containing a unique access point ID, which positively identifies the access point at which the at least one antenna is arranged, and a unique antenna ID within predefined intervals, wherein the beacons received by a mobile device are analyzed based on the RSSIs (Received Signal Strength Indicator) such that the distance of the mobile device to the at least one antenna can be determined, wherein an ID, which is stored in the mobile device and to which an access authorization can be explicitly assigned, and the received access point ID of an access control device can be transmitted to a server of the system or to the access control device by means of a wireless communication standard in order to analyze the validity of the access authorization assigned to the ID if the determined distance of the mobile device to at least one antenna of this access control device falls short of a threshold value, and wherein access is granted if the access authorization is valid for the access point ID.

According to an advantageous embodiment of the system, the at least one access control device has at least two antennas that are arranged in a predetermined manner and at a defined distance from one another, wherein all antennas lie on an antenna plane, wherein at least one and no more than $$\binom{n}{2}$$

antenna pairs can be formed of the existing n antennas, wherein a distance of the mobile electronic device (14) to a virtual line on the antenna plane, which connects the antennas of the respective antenna pair to one another, and therefore to the antenna plane can be determined as the length of the perpendicular distance of the farthest possible position of the mobile electronic device (14) from the antenna plane to the virtual line and to the antenna plane by means of bilateration based on the received signal strength of the beacons of two respective antennas of an antenna pair, wherein the determined distances to the virtual line on the antenna plane, which connects the antennas of the respective antenna pair to one another, can be analyzed in order to ascertain if at least one or a predefined number of the determined distances of an access control device falls below a certain threshold value, in which case an ID, which is stored in the mobile device and to which an access authorization can be explicitly assigned, and the received access point ID of this access control device are transmitted to a server or to the access control device by means of a wireless communication standard in order to analyze the validity of the access authorization assigned to the ID, and wherein access is granted if the access authorization is valid for the access point ID.

The invention claimed is:

1. An access control method in an access control system for persons,
   wherein the access control system comprises at least two access control devices (16) that are respectively assigned to an access point,
   each access control device (16) has at least two antennas (1, 2, 8, 9, 10, 11), which are arranged at the access point, the method comprising:
   transmitting by the at least two antennas (1, 2, 8, 9, 10, 11) beacons containing a unique access point ID, which identifies the access point at which the at least two antennas (1, 2, 8, 9, 10, 11) are arranged, and a unique antenna ID within predefined intervals,
   receiving by a server (15) or by the access control device (16) a response from a mobile device, said response containing an access authorization of the mobile device and the antenna ID of the antenna having the strongest signal determined based on the RSSIs (Received Signal Strength Indicator) and by means of bilateration,
   granting access if the access authorization is valid for the access point ID.

2. The access control method according to claim 1, wherein the response from the mobile device further comprises the distance between the strongest antenna and the mobile device, and the access is granted if the distance is lower than a threshold.

3. The access control method according to claim 1, wherein the antennas (1, 2, 8, 9, 10, 11) are realized in the form of directional antennas and/or the antennas (1, 2, 8, 9, 10, 11) are purposefully shielded in order to maximize the directional characteristic in the direction of the access area.

4. The access control method according to claim 1, wherein the transmitting power of each antenna (1, 2, 8, 9, 10, 11) is adaptable in order to thereby allow better modeling of the desired detection range in the access area.

5. The access control method according to claim 1, wherein the antenna configuration of the antennas (1, 2, 8, 9, 10, 11) of the access control devices (16) is stored in an app in dependence on the access point ID.

6. The access control method according to claim 1, wherein the beacons are BLE (Bluetooth Low Energy) beacons.

7. The access control method according to claim 1, wherein a wireless communication standard between the mobile device (14) and components of the access control system is one of a WIFI, GSM, LTE, 5G or Bluetooth standard.

8. An access control system for persons, for carrying out the method according to claim 1, wherein said access control system comprises at least two access control devices (16) that are respectively assigned to an access point, each access control device (16) has at least two antennas (1, 2, 8, 9, 10, 11), which are arranged at the access point in a defined manner and emits into the access area (3), i.e., into an area of predefined length and width, through which a visitor has to pass when attempting to gain access and which due to its dimensions can only accommodate one person, the at least two antennas (1, 2, 8, 9, 10, 11) are designed for transmitting beacons containing a unique access point ID, which positively identifies the access point at which the at least two antennas (1, 2, 8, 9, 10, 11) are arranged, and a unique antenna ID within predefined intervals, the method comprising the steps of:
   receiving from a mobile device a response comprising a mobile device ID, access point ID and signal strength determined based on the RSSIs (Received Signal Strength Indicator) and by means of bilateration of the signal of the beacons, and
   analysing the validity of the access authorization assigned to the mobile device ID if the determined distance of the mobile device (14) to at least one antenna (1, 2, 8, 9, 10, 11) of this access control device (16) falls short of a threshold value, and
   granting access the access authorization is valid for the access point ID.

9. The access control system for persons according to claim 8, wherein, all antennas of an access control device (16) lie on an antenna plane, at least one and no more than $$\binom{n}{2}$$

antenna pairs can be formed of the existing n antennas (1, 2, 8, 9, 10, 11), a distance of the mobile electronic device (14)

to a virtual line on the antenna plane, which connects the antennas of the respective antenna pair to one another, and therefore to the antenna plane can be determined as the length of the perpendicular distance of the farthest possible position of the mobile electronic device (14) from the antenna plane to the virtual line and to the antenna plane by bilateration based on the received beacons of two respective antennas of an antenna pair, the determined distances to the virtual line on the antenna plane, which connects the antennas of the respective antenna pair to one another, can be analyzed in order to ascertain if at least one or a predefined number of the determined distances to the antenna plane of an access control device (16) falls below a certain threshold value, in which case an ID, which is stored in the mobile device (14) and to which an access authorization can be explicitly assigned, and the received access point ID of this access control device (16) are transmitted to a server (15) or to the access control device (16) by means of a wireless communication standard in order to analyze the validity of the access authorization assigned to the ID, and access is granted if the access authorization is valid for the access point ID.

10. The access control system for persons according to claim 8, comprising the steps of:
receiving by the access control system the respective beacon received by the mobile device,
performing the RSSI analysis and the bilateration of the beacons takes in order to determine the distance between the mobile device and the respective antennas.

11. A mobile device application for transmitting a mobile device access authorization to an access point, said application being configured to:
receiving from at least two antennas (1, 2, 8, 9, 10, 11) arranged in the access point, beacons containing a unique access point ID, which identifies the access point, each beacons comprising a unique antenna ID received at predefined intervals,
analysing the received beacons based on the RSSIs (Received Signal Strength Indicator), whereby based on the received signal strength of the beacons the distance of the mobile electronic device to the antenna plane is determined by means of bilateration,
transmitting to the access point a response containing anaccess authorization and the antenna ID of the antenna having the shortest distance.

12. The mobile device application of claim 11, wherein is comprises the steps of:
grouping the received beacons per access control devices (16) based on the unique access point ID, and
smoothing the received signal strength of the beacons (RSSI) per antenna ID,
at least one and no more than $$\binom{n}{2}$$

antenna pairs are formed of the existing n antennas (1, 2, 8, 9, 10, 11), the distance of the mobile electronic device to a virtual line on the antenna plane, which connects the antennas of the respective antenna pair to one another, and therefore to the antenna plane is determined as the length of the perpendicular distance of the farthest possible position of the mobile electronic device (14) from the antenna plane to the virtual line and to the antenna plane by means of bilateration based on the received signal strength of the beacons of two respective antennas of an antenna pair;
the determined distances to the virtual line on the antenna plane, which connects the antennas of the respective antenna pair to one another, are analyzed in order to ascertain if at least one or a predefined number of the determined distances falls below a certain threshold value, in which case an ID, which is stored in the mobile device (14) and to which an access authorization can be explicitly assigned, and the received access point ID are transmitted to a server (15) or to the access control device (16) by means of a wireless communication standard in order to analyze the validity of the access authorization assigned to the ID.

13. The mobile device application of claim 11 wherein the mobile device receives at least three beacons originating from at least three antennas (1, 2, 8, 9, 10, 11), wherein the determined distances of the mobile electronic device (14) to a virtual line on the antenna plane, which connects the antennas (1, 2, 8, 9, 10, 11) of the respective antenna pair to one another, are used for respectively defining a virtual antenna on the virtual connecting line between the examined antennas of the respective antenna pair and for assigning to this virtual antenna a virtual radius to the mobile device (14), which corresponds to the determined distance to the virtual line at the position (6) of the virtual antenna, the position (6) of the virtual antenna corresponds to the dropped perpendicular foot of the perpendicular distance of the farthest possible position of the mobile electronic device (14) from the antenna plane to the virtual line and to the antenna plane, the at least one thusly defined virtual antenna is used for forming a virtual antenna pair in combination with another antenna, which may be a virtual antenna, and for determining the distance of the mobile electronic device (14) to a virtual line on the antenna plane, which connects the antennas of the virtual antenna pair to one another, and therefore to the antenna plane as the length of the perpendicular distance of the farthest possible position of the mobile electronic device (14) from the antenna plane to the virtual line and to the antenna plane by means of bilateration, and wherein all determined distances of the mobile electronic device (14) are analyzed.

14. The mobile device application of claim 11 wherein the model of the respective mobile device (14) is taken into consideration in the RSSI analysis of the beacons by using a model-specific correction value for the threshold value in order to compensate differences with respect to the reception sensitivity.

15. The mobile device application of claim 11 wherein the RSSI analysis of the beacons is optimized by using data of existing distance sensors of the mobile devices (14) in order to ascertain if a mobile device (14) is located in a pocket of the user, wherein an offset that increases the threshold value is additionally used if this is the case.

16. The mobile device application of claim 11 wherein the RSSI analysis of the beacons is optimized by determining if the mobile device (14) is currently in use, wherein an offset that reduces the threshold value is additionally used if this is the case.

17. The mobile device application of claim 11, wherein the RSSI analysis of the beacons takes place in the mobile device (14), an ID, which is stored in the mobile device (14) and to which an access authorization can be explicitly assigned, and the received access point ID of an access control device (16) are transmitted to a server (15) or to the access control device (16) by a wireless communication standard in order to analyze the validity of the access authorization assigned to the ID if at least one or a predefined number of the determined distances of the mobile device to the antenna plane of this access control device (16) falls short of a threshold value.

18. The mobile device application of claim 11 wherein the determined distances are recorded in the mobile device (14) during each entry, the received signal strengths of the beacons are reduced by a predefined factor prior to the RSSI analysis in order to prevent crosstalk if a predefined lower threshold value is not reached n-times, and n is a predefined integral number ≥1.

\* \* \* \* \*